(12) United States Patent
Lee et al.

(10) Patent No.: US 6,331,669 B1
(45) Date of Patent: Dec. 18, 2001

(54) BROADBAND COMMUNICATION KARAOKE

(76) Inventors: Shi-Cse Lee, No. 6, Lane 99, Chang Ji St., Taipei (TW); Tung-Hsing Pan, 3F, No. 12, Alley15, Lane71, Sec.1. Shi-Pei Rd., Peitou, Taipei (TW)

( * ) Notice: Subject to any disclaimer, the term of this patent is extended or adjusted under 35 U.S.C. 154(b) by 0 days.

(21) Appl. No.: 09/691,027

(22) Filed: Oct. 19, 2000

(51) Int. Cl.[7] .............................. G09B 5/00; G09B 15/04; G10H 1/26

(52) U.S. Cl. ...................... 84/609; 84/477 R; 84/DIG. 6; 434/307 A

(58) Field of Search ..................... 84/601, 602, 609–614, 84/634–638, 477 R, 478, DIG. 6; 434/307 A

(56) References Cited

U.S. PATENT DOCUMENTS

| | | | |
|---|---|---|---|
| 5,335,073 | * | 8/1994 | Yamamoto ........................ 84/601 X |
| 5,900,566 | * | 5/1999 | Mino et al. .......................... 84/610 |
| 6,083,009 | * | 7/2000 | Kim et al. ......................... 84/609 X |

* cited by examiner

*Primary Examiner*—Stanley J. Witkowski
(74) *Attorney, Agent, or Firm*—Jacobson Holman, PLLC

(57) ABSTRACT

A broadband communication karaoke includes a tuner, a transceiver, a decoder, a video conditioner, a karaoke signal processor, a microprocessor and an IR receiver, wherein the tuner is connected to a cable of CATV systems while the microprocessor is used to control the tuner, the transceiver, the decoder and the karaoke signal processor. And at least one microphone is attached to the karaoke signal processor. By means of an IR remote transmitter and the IR receiver, users can order songs and display the music and pictures through CATV systems.

13 Claims, 11 Drawing Sheets

BROADBAND COMMUNICATION KARAOKE

BACKGROUND OF THE INVENTION

The present invention relates to a broadband communication karaoke, more particularly, to a music player connected with CATV which could also be connected with cable TV system so that users can select their favorite music from the server freely.

Those who are addicted to singing seldom become famous singers of popular music. Most of them desire to find an outlet for their idleness and boring daily life thus a KTV store could satisfy their needs and thus get them popular. However, the fee of singing in the KTV store is somewhat higher than a normal expense. Therefore, a better way is to invite several friends to join the singing party and share the cost. By doing so, people not only save the cost for entertainment but also enjoy singing more with others than singing along. Hence, if there is not any friend available, singing in the KTV store becomes dull and uninteresting.

On the other hand, only young people are the main consuming customers in KTV store. For elders who are already retired or unemployed, they are not willing to sing in the KTV store due to the high expense and inconvenience of finding partners.

It is unusual to go to sing in the KTV alone so there is a karaoke machine with CD or tapes in the market for people who want to sing by themselves. The disadvantage of this machine is that the number of songs for a selection is much less than that in the KTV store and thus less attractive.

SUMMARY OF THE INVENTION

Therefore, it is a primary object of the present invention to provide a broadband communication karaoke that can be connected to CATV cables. Taking advantage of the device, users can order or sing songs via CATV systems. Just staying at home without any trouble of going out, one may amuse himself from a great amount of songs.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
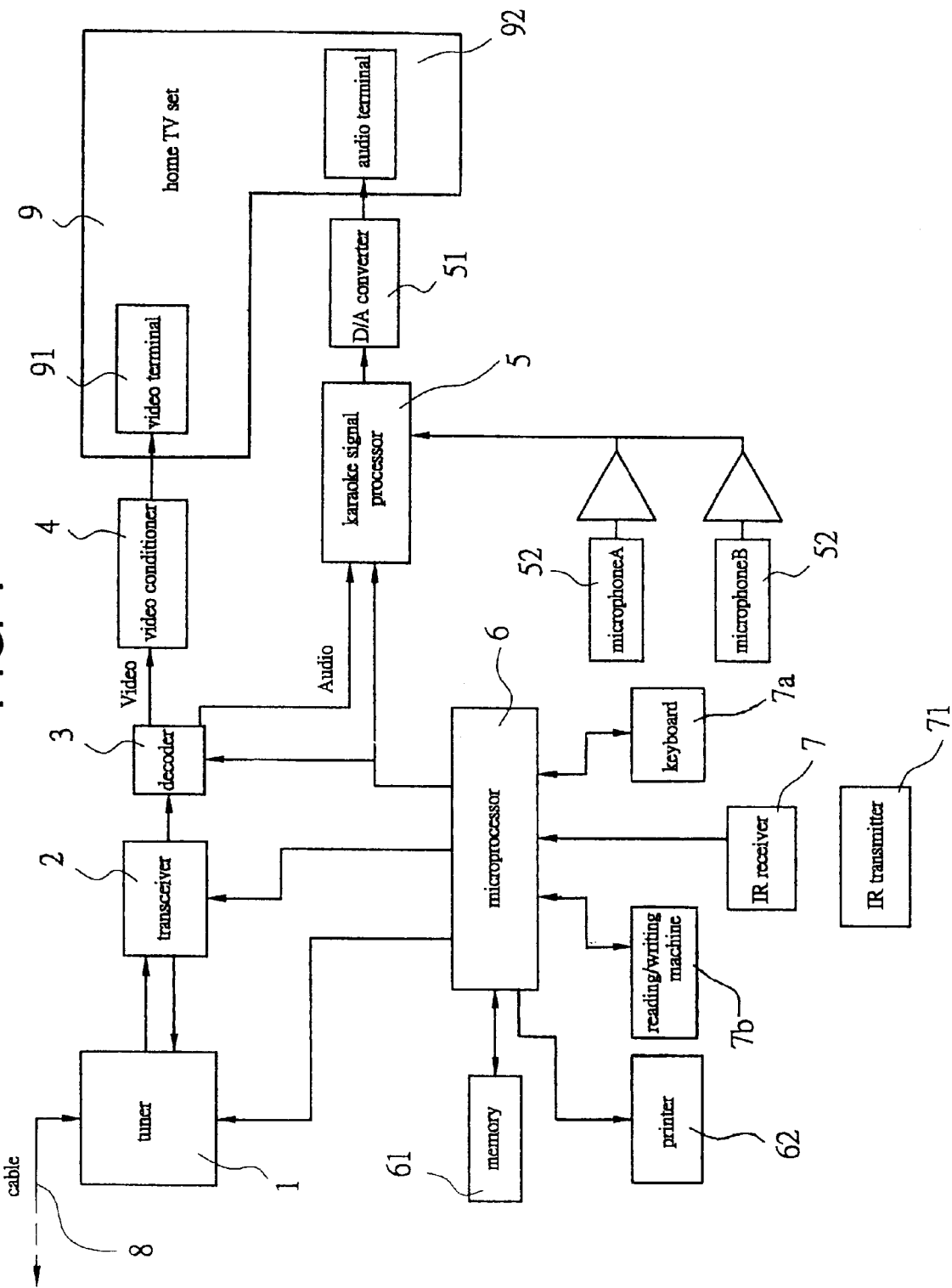
FIG. 1 is a circuit diagram of the present invention.

Referring to FIG. 1, the invention primarily includes a tuner (1), a transceiver (2), a decoder (3), a video conditioner (4), a karaoke signal processor (5), a microprocessor (6) and an IR receiver (7). The connection circuits and functions of these seven components are described respectively as follows:

The tuner (1) is connected to a cable (8) of a two-way CATV system for selecting program channels offered by the system;

The transceiver (2) is connected to the tuner (1) and used to transmit or receive signals;

The decoder (3) is connected to the transceiver (2) to decode the signals received by transceiver (2) into digital video and audio signals;

The video conditioner (4) is connected between the decoder (3) and video terminals (91) of a home TV set (9) and used to transform the digital signals decoded by the decoder (3) into TV compatible signals;

The karaoke signal processor (5) is connected to the decoder (3), a D/A converter (51) and audio terminals (92) of the home TV set (9), as well as at least one microphone (52), and used to mix the digital audio signals input from the decoder (3) and the microphone (52). These mixed digital audio signals are transformed into analog signals by the D/A converter (51) and then output to audio terminal (92) of the home TV set (9);

The microprocessor (6) is connected with the tuner (1), the transceiver (2), the decoder (3) and the karaoke signal processor (5) to control the operation of these units, and also connected to a memory (61) and a printer (62);

The IR receiver (7) is connected to the microprocessor (6) to receive the signals from IR transmitter (71) in order to control the operation of microprocessor (6).

As shown above, users can select a channel offered by CATV systems via the tuner (1) and operate the whole device by control signals sent from IR transmitter (71) through IR receiver (7) and then to the microprocessor (6).

Figure 2:
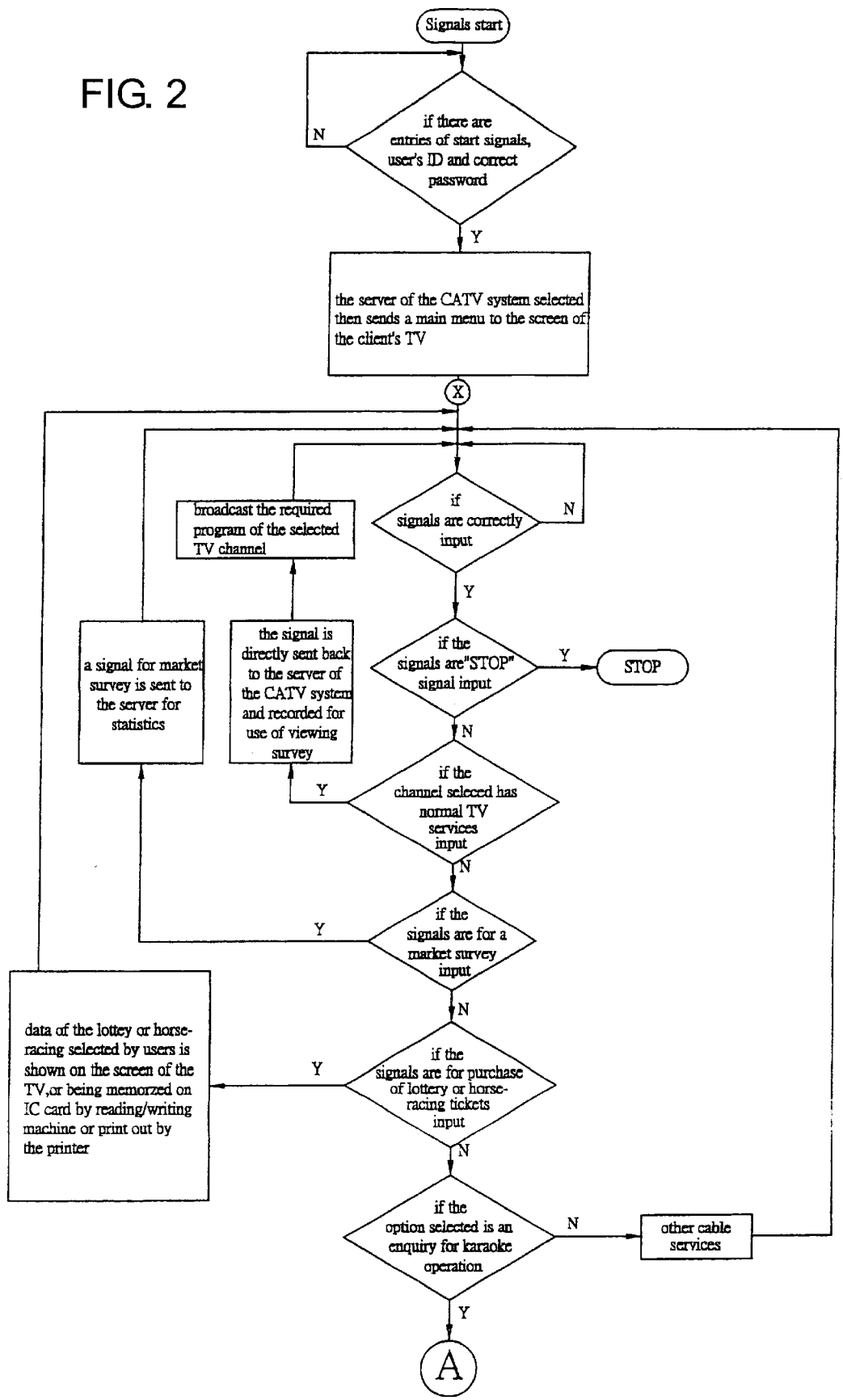
FIG. 2 is a flow chart of the present invention's primary program.
Figure 3:
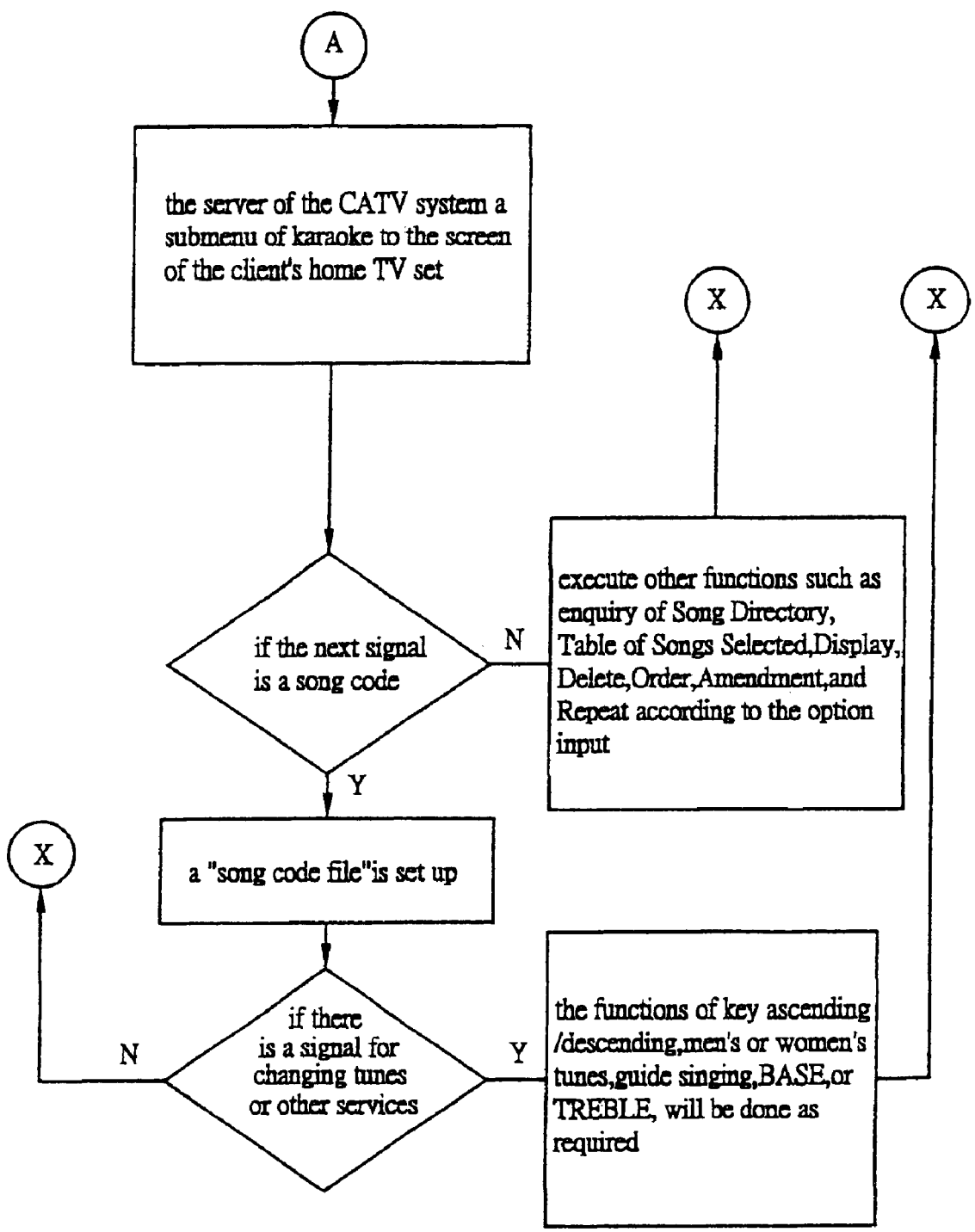
FIG. 3 is a continued flow chart of the invention's primary program.

FIGS. 2 and 3 indicate the operation flow charts of the invention's primary program. As soon as the primary program begins to run, it immediately determines if there are entries of start signals, user's ID and a password. If the start signals, user's ID and correct password are surely input, the server of the CATV system selected will then send a main menu to the screen of the client's TV (9). The primary program will make sure again if signals are correctly input, if the signals are "STOP" signal, if the channel selected has normal TV services, if the signals are the answers for a market survey from TV or for purchase of lottery or horse-racing tickets, or if the option selected is an inquiry for karaoke operation. If the program is not selected for karaoke operation then it will shift to other cable services. Otherwise, if there is no signal, user's ID and password is input, the program will repeat an input inquiry again and again. In addition, the TV also has other services.

In case that the channel selected has no wide frequency services (i.e. it is a normal TV services), the signal of the channel being selected will be automatically sent back to the server of the CATV system and recorded for use of viewing survey when the TV is turned on. The server then broadcast the required program of the selected TV channel.

Figure 4:
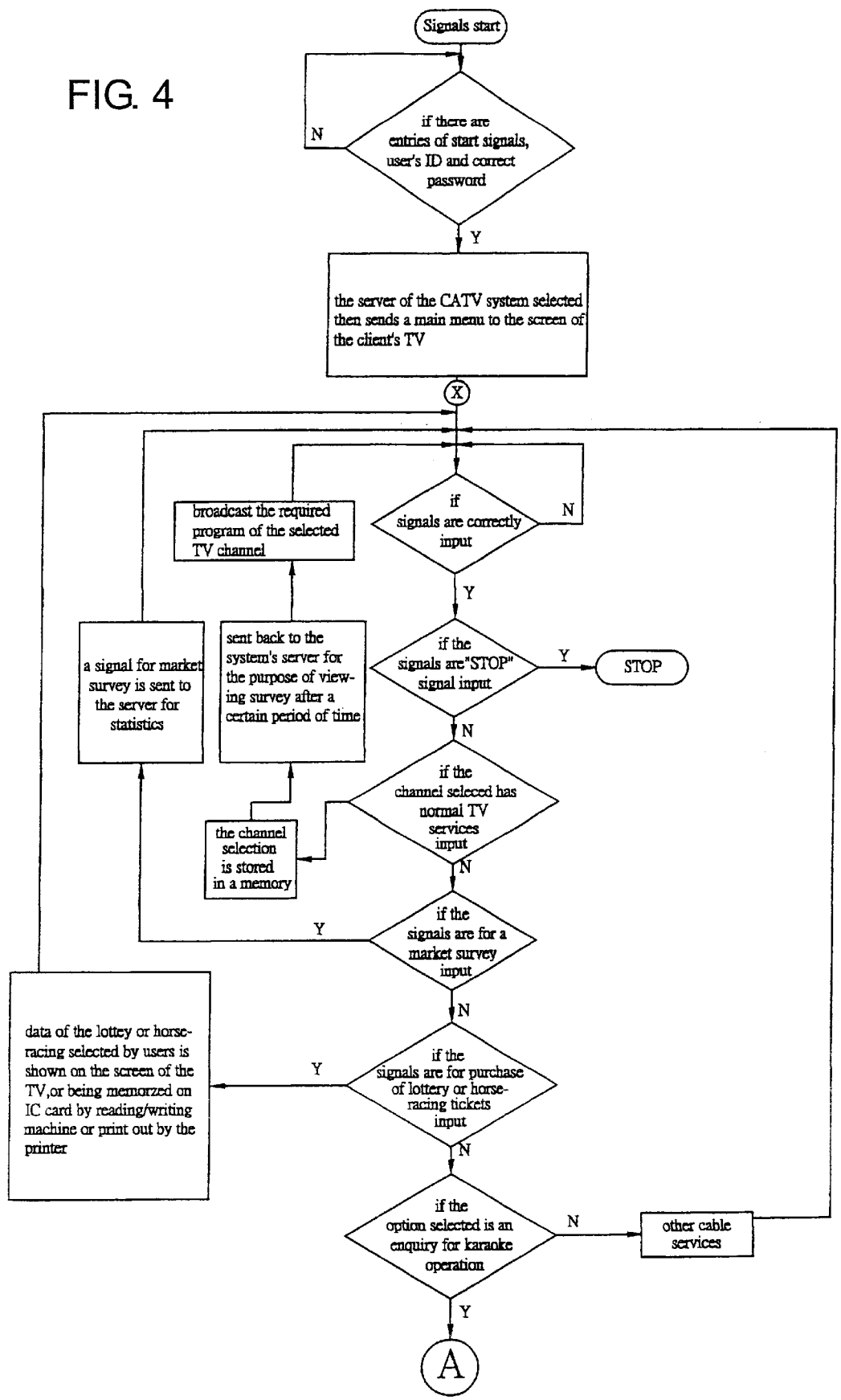
FIG. 4 is a flow chart of another embodiment of the invention's primary program (1)

The channel selection signal, referring to FIG. 4, can also be stored in a memory (61), and sent back to the system's server after a certain period of time for the purpose of viewing survey. This is a further embodiment of the invention for reference.

Figure 5:
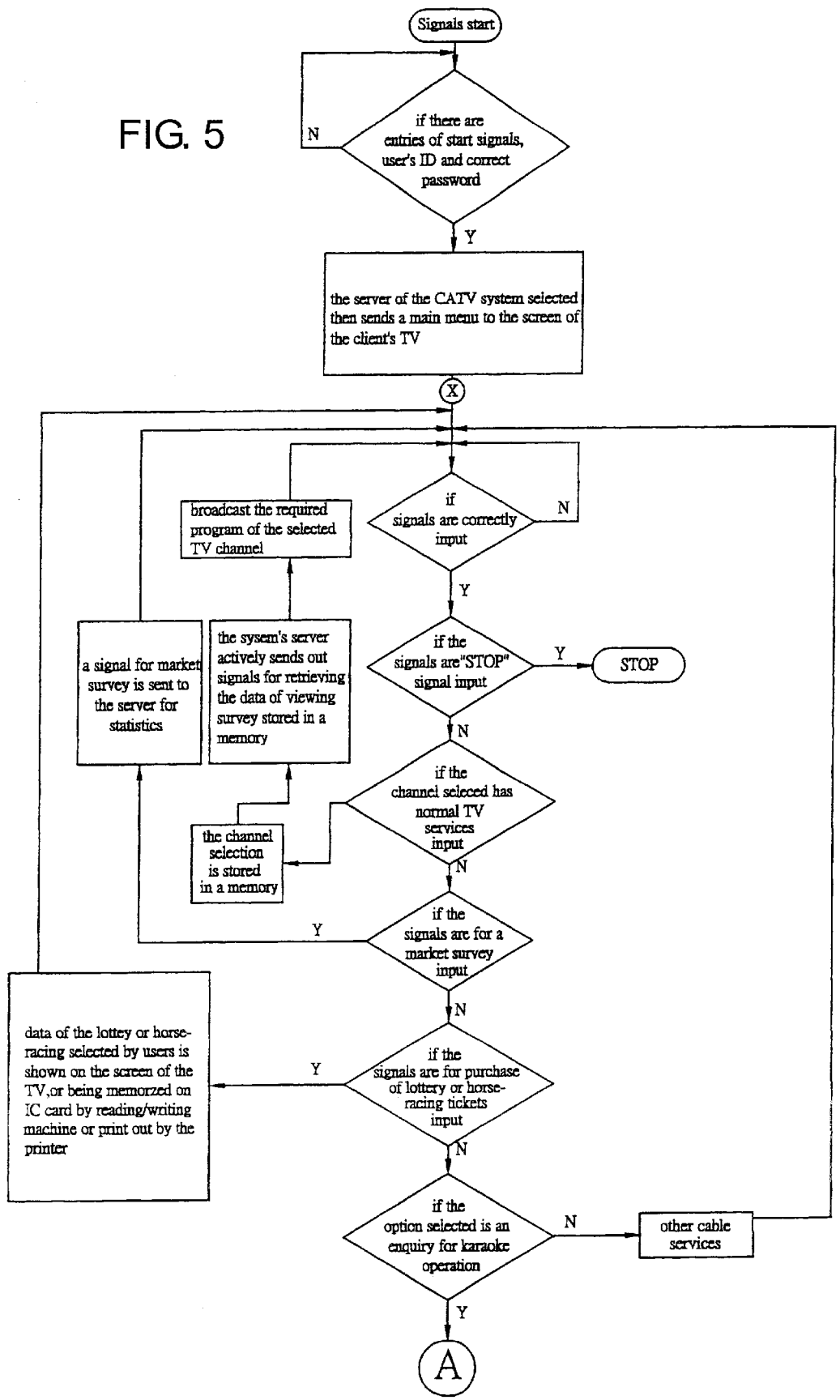
FIG. 5 is a flow chart of another embodiment of the invention's primary program (2)

With reference of FIG. 5, the system's server can also actively send out signals for retrieving the data of viewing survey in a memory (61). This is another embodiment of the present invention.

Figure 6:
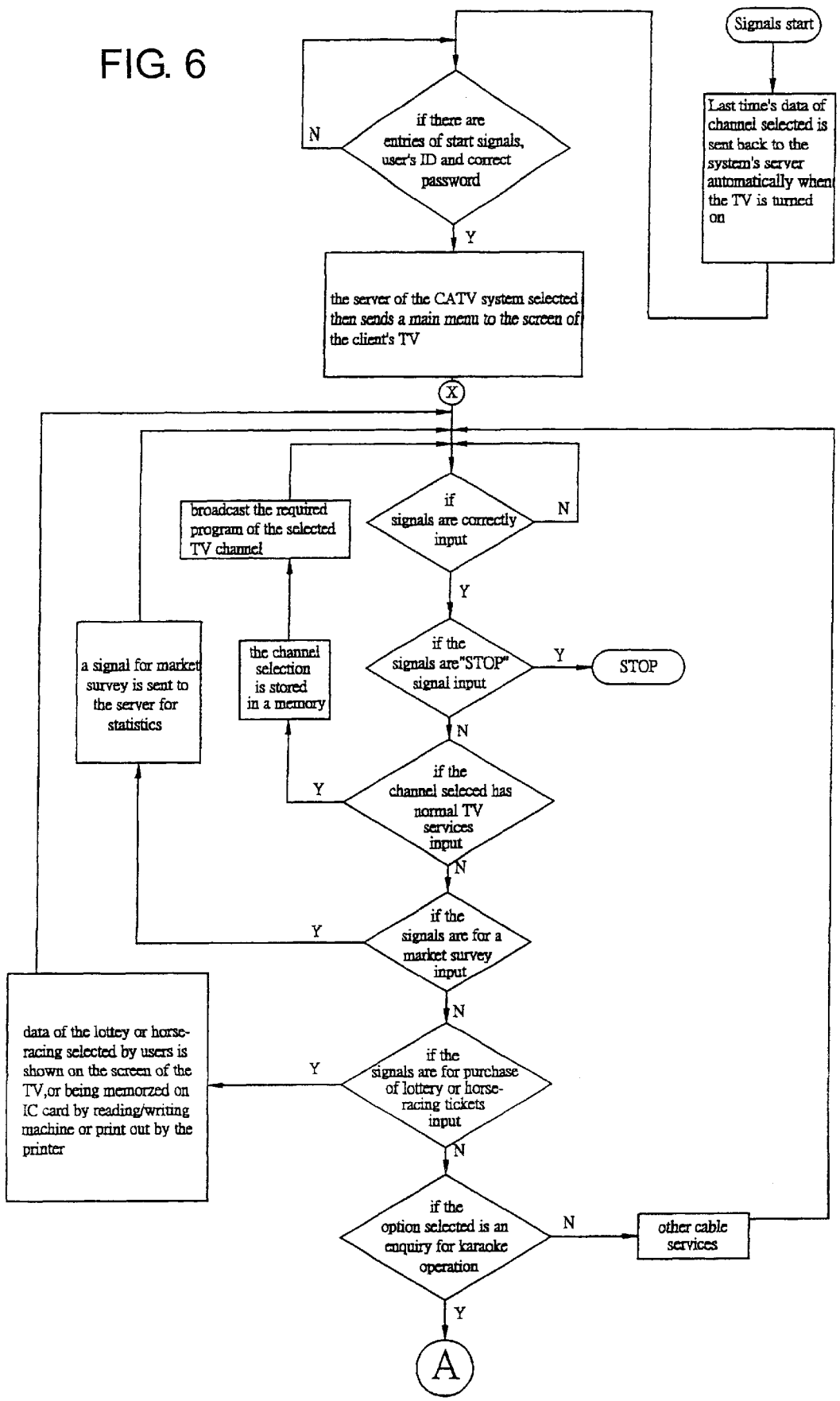
FIG. 6 is a flow chart of another embodiment of the invention's primary program (3)

Referring to FIG. 6, a signal of the channel being selected any time is stored in a memory (61) and is sent back to the system's server automatically when the next time the television is turned on. This is the most important embodiment of the present invention.

Moreover, if the option of "Market Survey" is chosen, the user watching the selected program only needs to send a signal via IR transmitter (71) to the server for statistics.

If the option of "Lottery & Horse-racing" is chosen, the user only has to send certain data of the lottery or horse-racing he selected to the server. His selection will be shown on the screen of his TV, and at the same time printed out by the printer (62) or recorded on an IC card by a card reading/writing machine (7b).

Furthermore, if the option of "karaoke" is chosen, the server of the CATV system will then send a submenu of karaoke to the screen of the client's home TV set (9). Then, the primary program will determine if the next signal is a song code. If no, the primary program executes other functions such as enquiry of Song Directory, Table of Songs Selected, Display, Delete, Order Amendment, and Repeat according to the option input. However, if yes, a "song code file by request" will be set up, and then the primary program will determine if there is a signal for changing tunes—if yes, the functions of key ascending/descending, men's or women's tunes, guide singing, BASE, TREBLE will be done as required; if no, the primary program will return to Procedure X.

Figure 7:
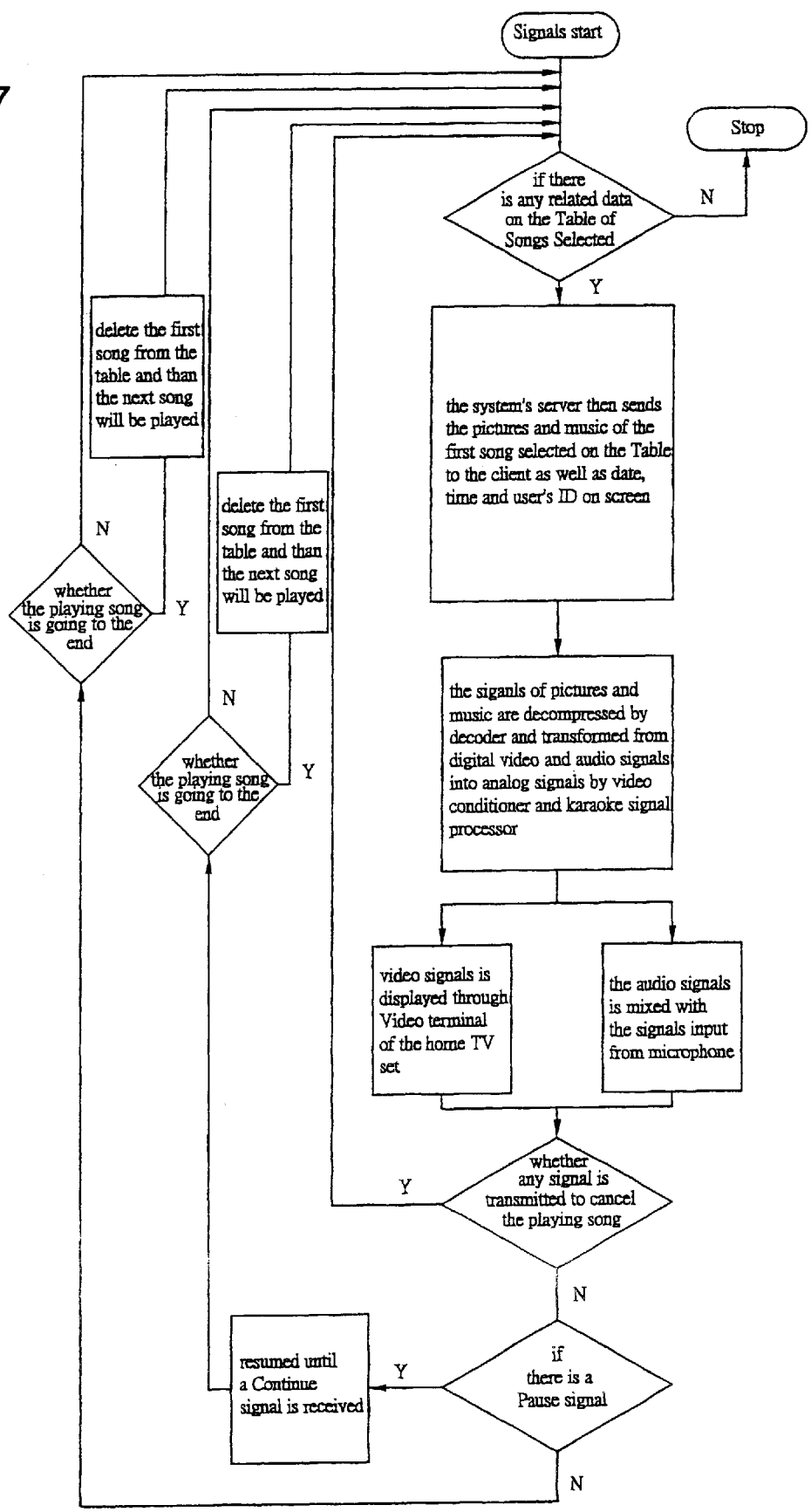
FIG. 7 is a flow chart of the present invention's sub-program.

Referring to FIG. 7, if the karaoke option is selected and the corresponding karaoke sub-program is being run, the sub-program will initially determine if there is any related data on the Table of Songs Selected. If yes, the system's server will then send the pictures and music of the first song selected on the Table to the client's screen, as well as date, time and user's ID, etc. in such a way that pirate copies of the karaoke screen and music can be prevented.

Afterwards, the signals transmitted from the CATV system's server will be decompressed by the decoder (3), then transformed from digital video and audio signals into analog signals by the video conditioner (4) and the karaoke signal processor (5), and received respectively by video terminals (91) and audio terminals (92) of the home TV set (9). At last, the audio signals will be mixed with the signals input from the microphone (52).

After all that stated above is completed, the sub-program determines whether any signal is transmitted to cancel the playing song. If yes, then the sub-program will terminate the song and start to play the next. If there is a Pause signal, the playing song will be paused, and resumed until a Continue signal is received. Finally, the sub-program will determine whether the playing song is going to the end—if no, the song will continue; if yes, then the next song will be played.

Since the invention is connected to the cable (8) of a two-way CATV system, there will be a great amount of songs for users to choose to amuse themselves without any trouble of going out.

Besides, the IR receiver (7) and the IR transmitter (71) can be substituted by a keyboard (7a) as a signal input device while the printer (62) can be replaced by the IC card reading/writing machine (7b) if being needed. This is another embodiment of the present invention for reference.

Figure 8:
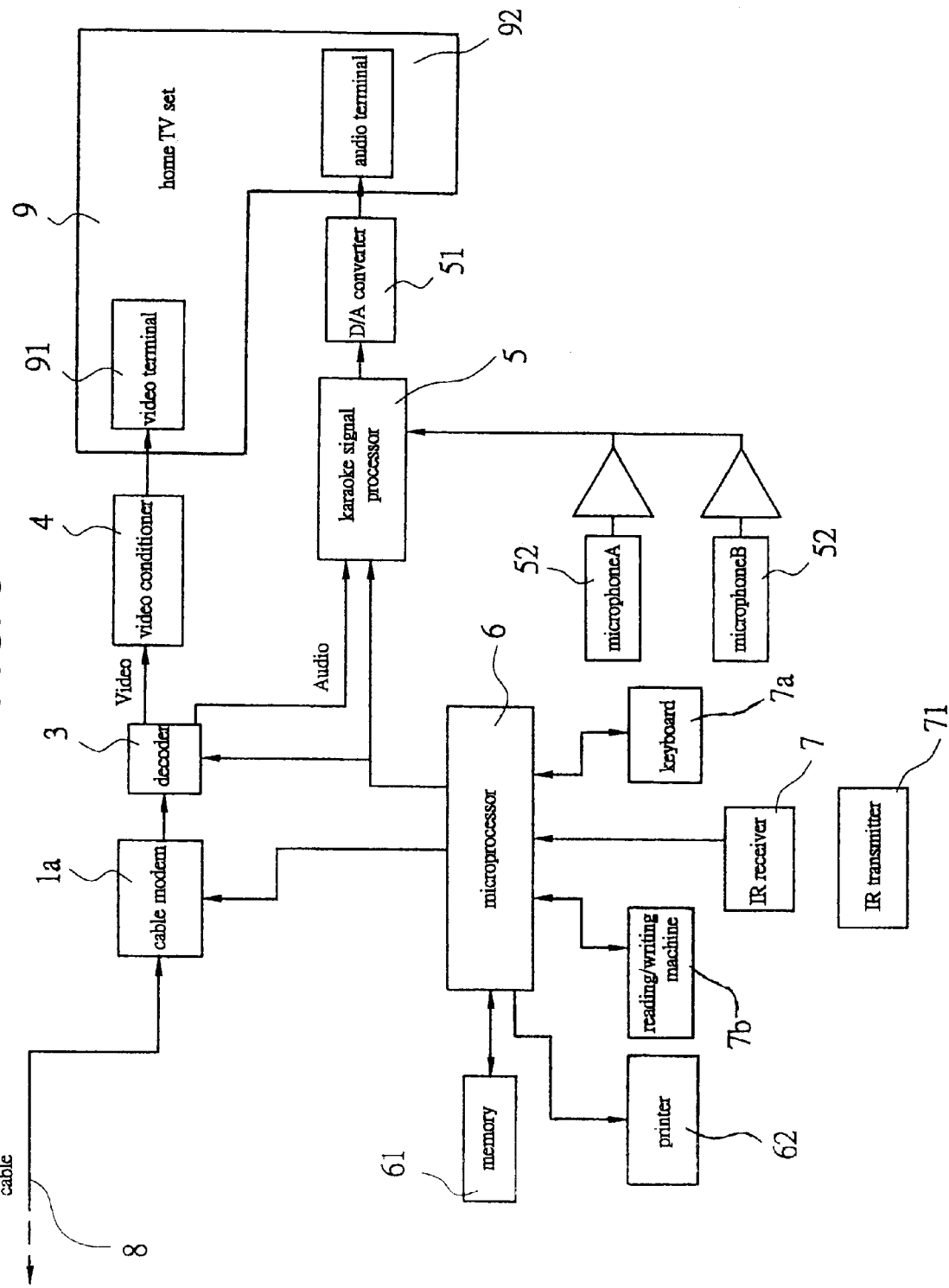
FIG. 8 is a circuit diagram of another embodiment of the present invention (1)

In reference to FIG. 8, the tuner (1) and the transceiver (2) can be replaced with a cable modem (1a) as required. This cable modem (1a), connected between the microprocessor (6) and the cable (8) of a two-way CATV system, has the same functions that the tuner (1) and the transceiver (2) may do. This is another embodiment of the present invention.

Figure 9:
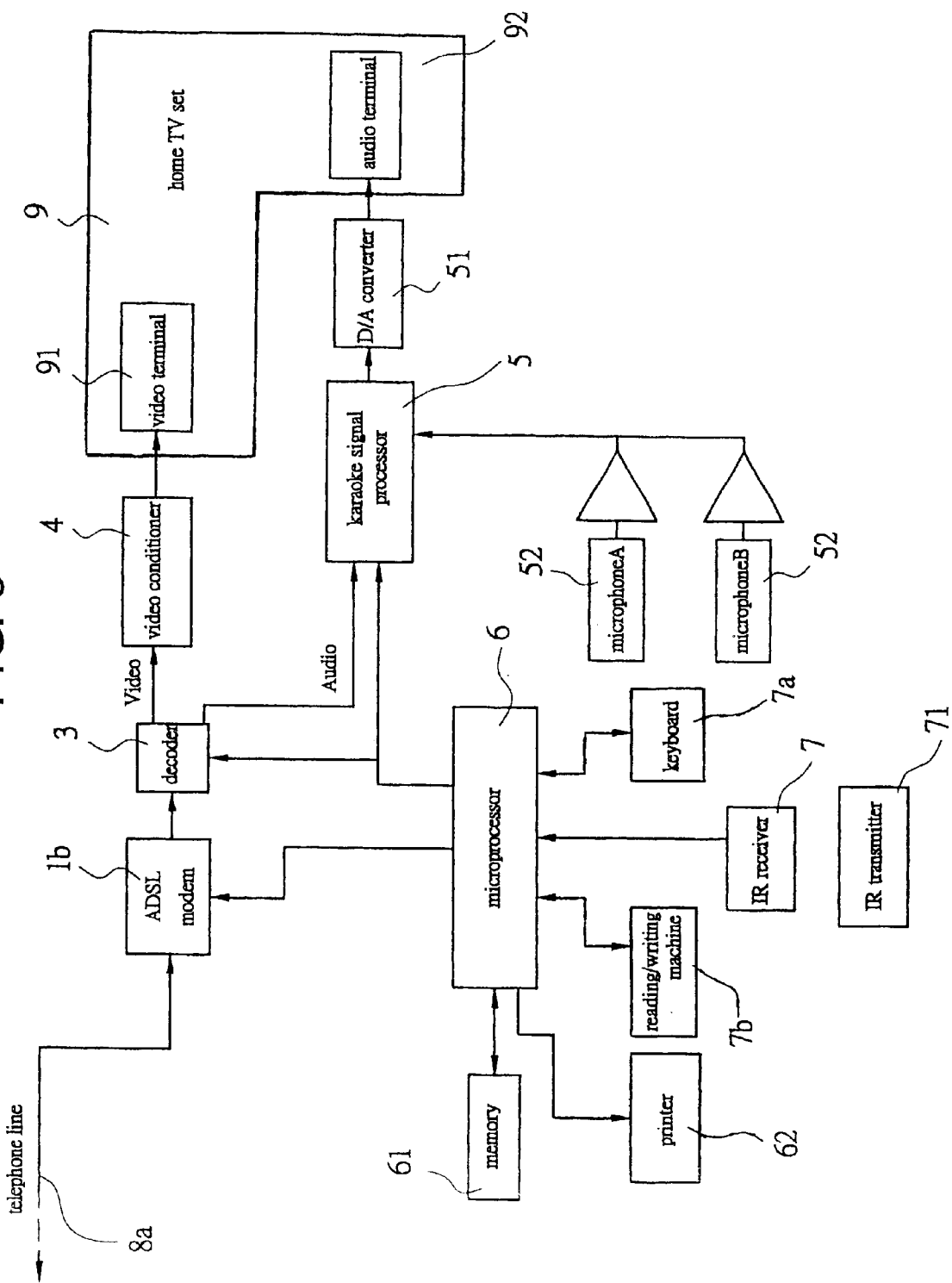
FIG. 9 is a circuit diagram of another embodiment of the present invention (2)

As shown in FIG. 9, the tuner (1) and the transceiver (2) is replaced with a ADSL modem (1b) as required. The ADSL modem, connected between the microprocessor (6) and a telephone line (8a), has the same functions that the tuner (1) and the transceiver (2) can do. This is another embodiment.

Figure 10:
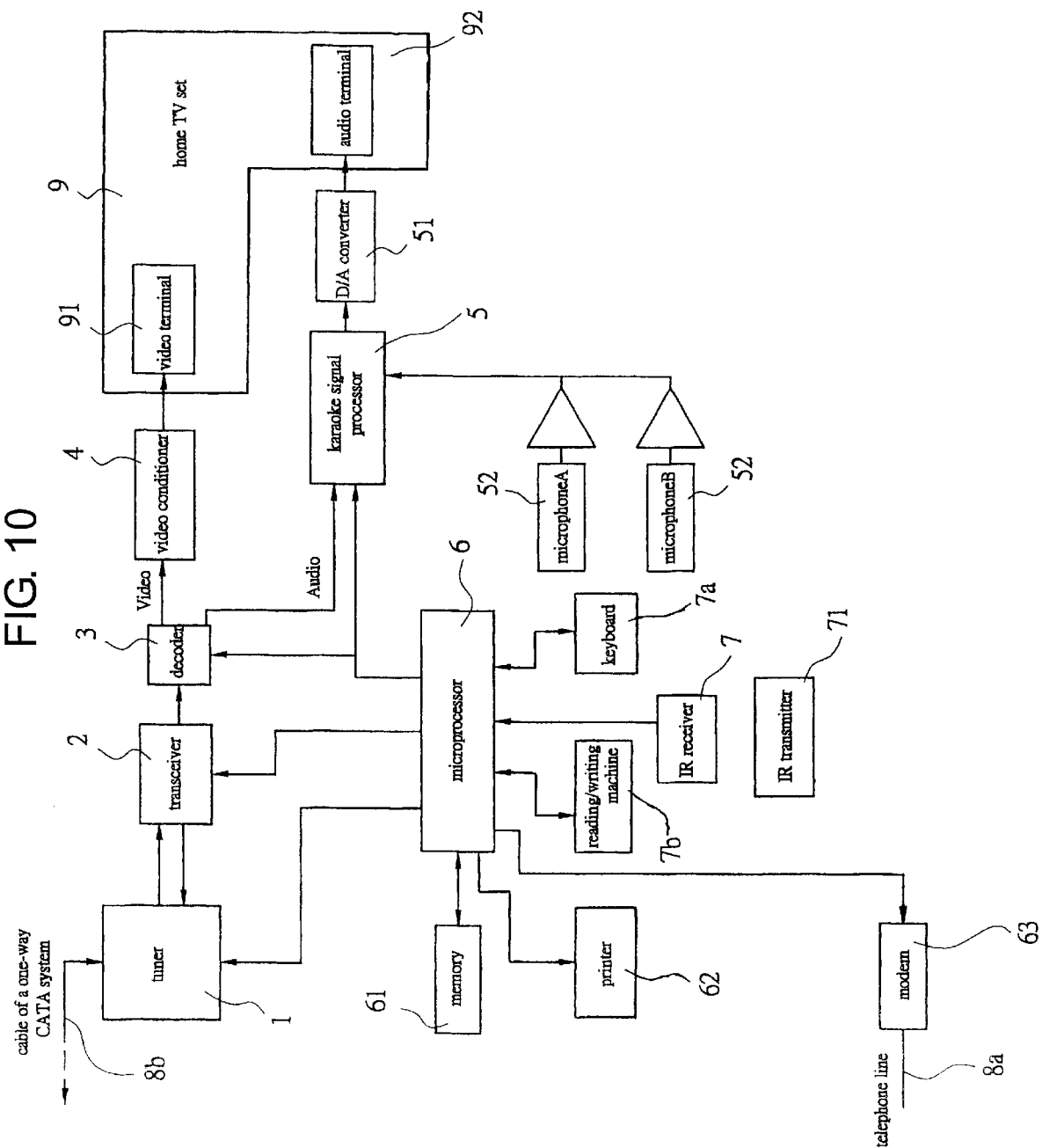
FIG. 10 is a circuit diagram of another embodiment of the present invention (3)

As shown in FIG. 10, the tuner (1) can be connected to a cable (8b) of a one-way CATV system while the microprocessor (6) is connected to a modem (63) which is connected to the telephone line (8a). With such assembling way, the device is used for statistics of viewing rate or karaoke for singing. This is another embodiment of the invention for reference.

Figure 11:
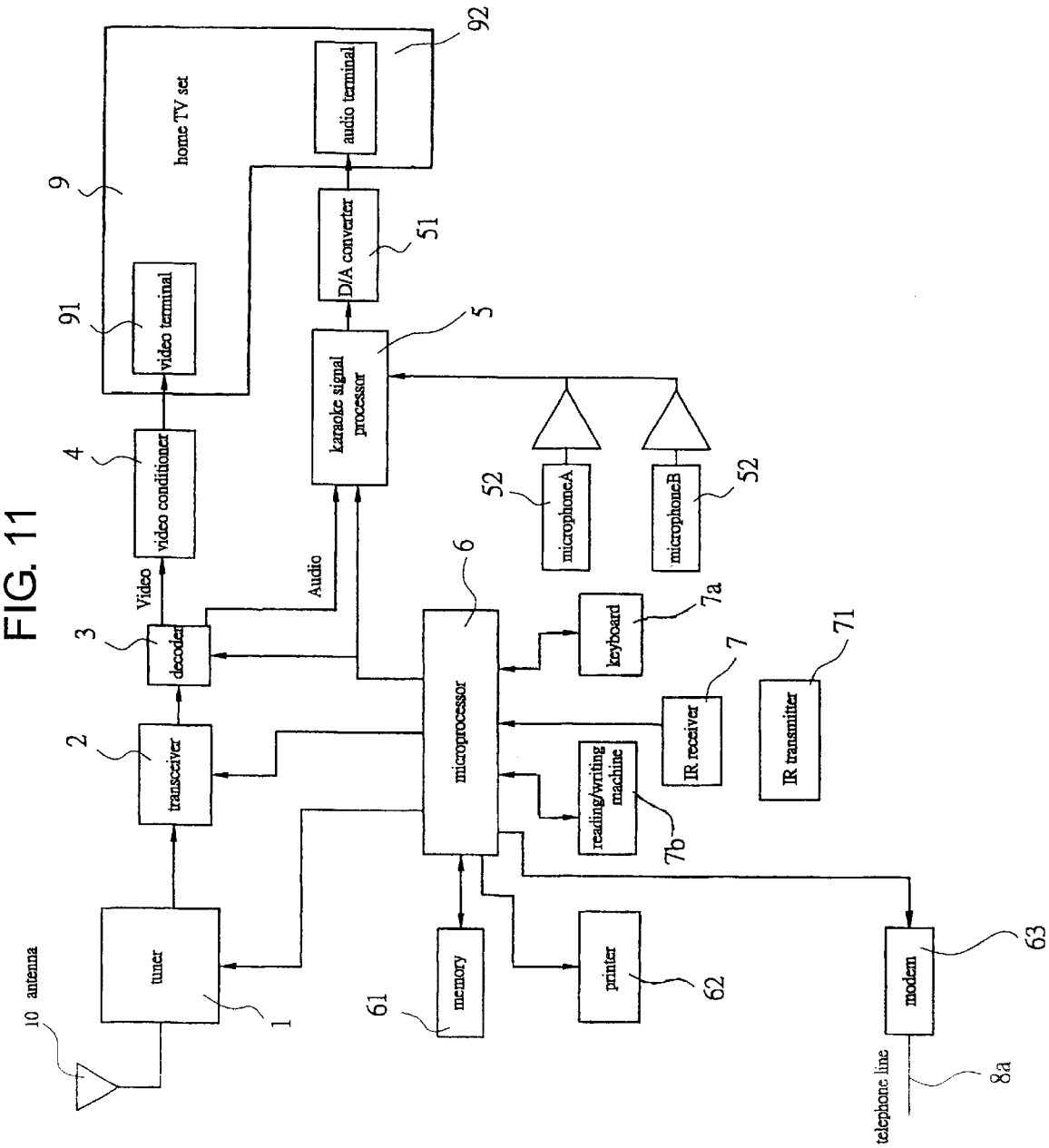
FIG. 11 is a circuit diagram of another embodiment of the present invention (4).

Referring to FIG. 11, the tuner (1) can be connected to an antenna (10) for receiving video or audio signals from satellite while the microprocessor (6) is connected to a modem (63) which is connected to the telephone line (8a). In accordance with this structure, the device has functions of both viewing rate statistics and karaoke machine.

This is another embodiment of the present invention.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A real-time broadband communication karaoke comprising:

a tuner for connecting to a cable of a two-way CATV system having selectable program channels, said tuner for selecting said program channels offered by said CATV system;

a transceiver for connecting to said tuner and being used to transmit or receive signals;

a decoder connected to said transceiver for decoding the signals received by transceiver into digital video and audio signals;

a video conditioner connected between said decoder and video terminals of a home TV set and for transforming the digital signals decoded by said decoder into TV compatible video signals;

a home TV set having audio terminals and video terminals for receiving said signal TV compatible video signals;

a karaoke signal processor connected to said decoder, a D/A converter and said audio terminals of said home TV set, as well as at least one microphone for producing audio signals and, said karaoke signal processor for mixing digital audio signals input from said decoder with said audio signals from said microphone, then transforming mixed digital audio signals into analog signals by said D/A converter and being output to said audio terminals of said home TV set;

a microprocessor connected with said tuner, said transceiver, said decoder and said karaoke signal processor to control the operation of these units;

a memory connected to said microprocessor for storing data;

a printer connected to said, microprocessor for providing printings;

an IR receiver connected to said microprocessor to receive signals; and an IR transmitter for receiving the signals from said IR receiver and sending the signals to said microprocessor.

2. The real-time broadband communication karaoke as claimed in claim 1, further comprising a keyboard connected to said microprocessor for inputting data.

3. The real-time broadband communication karaoke as claimed in claim 1, further comprising a card reading/writing machine connected to said microprocessor for writing and reading a card.

4. The real-time broadband communication karaoke as claimed in claim 1, further comprising a cable modem connected to said microprocessor.

5. The real-time broadband communication karaoke as claimed in claim 1, further comprising a ADSL modem connected between said microprocessor and a telephone line.

6. The real-time broadband communication karaoke as claimed in claim 1, wherein said tuner is connected to a cable of a one-way CATV system while said microprocessor is connected to a modem that is attached to a telephone line.

7. The real-time broadband communication karaoke as claimed in claim 1, wherein said tuner is connected to an antenna that receives video or audio signals from a satellite while said microprocessor is connected to a modem which is connected to a telephone line.

8. The real-time broadband communication karaoke as claimed in claim 1, wherein said memory is used to store channel selection signals which will be sent back to the system's server after a certain period of time for the purpose of storing data for a viewing survey.

9. The real-time broadband communication karaoke as claimed in claim 1, wherein said memory is used to store channel selection signals and a system's server will actively retrieve said signals stored in a memory for a viewing survey.

10. The real-time broadband communication karaoke as claimed in claim 1, wherein a signal of the program channel of said CATV system being selected at any time is stored in said memory and then is sent back to the system's server automatically when the home TV set is turned on the next time.

11. The real-time broadband communication karaoke is claimed in claim 1, wherein signals chosen are input through said IR transmitter by users watching the selected program and then sent back to a server for storing statistics of a market survey.

12. The real-time broadband communication karaoke as claimed in claim 1, wherein certain data of lottery or horse-racing users selected is input through said IR transmitter and then sent back to a server while the selection is also shown on a screen of said home TV set and being printed out by said printer.

13. The real-time broadband communication karaoke as claimed in claim 1, wherein certain data of lottery or horse-racing users selected is input through said IR transmitter and then sent back to a server while the selection is also shown on a screen of said home TV set and being recorded on an IC card by a card reading/writing machine.

* * * * *